United States Patent Office 3,654,236
Patented Apr. 4, 1972

3,654,236
TERPOLYAMIDES
James S. Ridgway, Pensacola, Fla., assignor to
Monsanto Company, St. Louis, Mo.
No Drawing. Continuation-in-part of application Ser. No. 758,687, Sept. 10, 1968. This application Sept. 15, 1970, Ser. No. 72,529
Int. Cl. C08g 20/20
U.S. Cl. 260—78 R
10 Claims

ABSTRACT OF THE DISCLOSURE

High shrinkage polymers useful in production of hosiery and crimpy conjugate yarns are provided by linear terpolyamides of at least one aliphatic diamine such as hexamethylene diamine, at least one aliphatic dicarboxylic acid such as adipic acid, at least one benzene dicarboxylic acid such as terephthalic acid and at least one diphenyl-substituted aliphatic dicarboxylic acid such as $\alpha,\alpha'$-diphenyladipic acid.

CROSS-REFERENCE TO RELATED APPLICATION

This application is a continuation-in-part of my copending application Ser. No. 758,687 which was filed on Sept. 10, 1968, now abandoned.

BACKGROUND OF THE INVENTION

It is well known that various polyamides such as polyhexamethylene adipamide are widely used in the production of textile fibers. However, substantial efforts are being continued to develop new polyamides having properties that are even more desirable for such uses. For example, most of the known polyamides have a relatively low boiling water shrinkage. That is, the amount of shrinkage that occurs in fibers made of such polyamides when they are immersed in boiling water is relatively small, e.g. on the order of ten percent or less. In some commercial uses, for example in hosiery, it is desirable that the polyamide fibers have a substantially greater degree of boiling water shrinkage. In the production of crimpy conjugate fibers (i.e. fibers having one or more components) it is likewise very desirable that at least one component has a relatively high shrinkage so that the crimp in the conjugate fiber is substantial and permanent.

Another characteristic that limits the versatility of many polyamides is that they are highly resistant to water absorption and therefore must be blended with higher proportions of other more absorbent materials for use in clothing that will be comfortable to the wearer. Accordingly, there is also a current need to develop new polyamides that are better suited for the numerous applications in which more water-absorbent fibers are required.

It is therefore an object of this invention to provide novel fiber-forming polyamides which have a high degree of boiling water shrinkage. Another object of the invention is to provide novel polyamides which do not have a high degree of water absorption resistance. Other objects will become apparent from the following detailed description of the invention.

SUMMARY OF THE INVENTION

It has now been discovered that the foregoing objectives can be achieved by a highly polymeric linear terpolyamide composed of recurring units having the structure

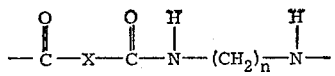

wherein $n$ is an integer from 2 to 10 X in 50 to 90 percent of said units is a $C_2$-$C_{10}$ polymethylene radical, X in 5 to 45 percent of said units is a meta-phenylene or para-phenylene radical and X in 5 to 45 percent of said units has the structure

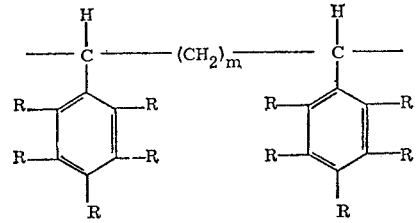

wherein each R is hydrogen or lower ($C_1$-$C_4$) alkyl and $m$ is an integer from 2 to 8.

DETAILED DESCRIPTION OF THE INVENTION

The terpolyamides of this invention can be prepared by copolymerizing at least one (preferably saturated) aliphatic diamine containing from 2 to 10 carbon atoms, at least one straight-chain aliphatic dicarboxylic acid in which the (preferably saturated) aliphatic chain contains 4 to 12 carbon atoms, at least one benzene dicarboxylic acid selected from the group consisting of terephthalic acid and isophthalic acid and at least one diphenyl-substituted aliphatic dicarboxylic acid in which the (preferably saturated) aliphatic chain contains 6 to 12 carbon atoms and in which the phenyl substituents are attached to the $\alpha$ carbon atoms of the acid (i.e. the carbon atoms directly attached to the carboxyl groups of the acid). Although the invention encompasses the terpolyamides provided by copolymerizing a mixture of such reactants in which the mole percentage of the straight-chain aliphatic dicarboxylic acid may be from 50 to 90, the mole percentage of the benzene dicarboxylic acid may be from 5 to 45 and the mole percentage of the diphenyl-substituted aliphatic dicarboxylic acid may be from 5 to 45, each based on the total moles of dicarboxylic acid in the mixture, terpolyamides of especially high boiling water shrinkage and relatively low water absorption resistance are obtained when the reaction mixture contains 50 to 80 mole percent of the straight-chain aliphatic dicarboxylic acid, 10 to 30 mole percent of the benzene dicarboxylic acid and 10 to 25 mole percent of the diphenyl-substituted aliphatic dicarboxylic acid, each based on the total moles of dicarboxylic acid in the mixture. Terpolyamides of especially high boiling water shrinkage and even lower water absorption resistance are obtained when the reaction mixture contains 50 to 60 mole percent of the straight-chain aliphatic dicarboxylic acid, 20 to 25 mole percent of the benzene dicarboxylic acid and 20 to 25 mole percent of the diphenyl-substituted aliphatic dicarboxylic acid, each based on the total moles of dicarboxylic acid in the mixture.

In view of the properties of similar known polyamides, it is quite unexpected that fibers formed from the terpolyamides of this invention have high boiling water shrinkage. Thus, for example, polyhexamethylene adipamide fibers have a boiling water shrinkage of only about ten percent and when about twenty percent of the adipic acid in such a homopolymer is replaced with terephthalic acid, the shrinkage of the resulting copolyamide is still only about ten percent, but when a substantial proportion of the adipic acid in such a copolyamide is replaced with a diphenyl-substituted aliphatic dicarboxylic acid (e.g. $\alpha,\alpha'$-diphenyladipic acid) in accordance with the present invention, the boiling water shrinkage of the resulting terpolymer is much greater and typically at least several times that value (e.g. in the range of 20–35%). The water absorption characteristics of the terpolyamides of this invention are also unexpected in view of prior art such as U.S. Pat. No. 2,880,196 which discloses that copolymers of diphenyladipic acid, an aliphatic diamine such as hexamethylene diamine and an aliphatic dicarboxylic acid such as adipic acid are much more resistant to water absorption than a commercially prominent polyamide such as polyhexamethylene adipamide. Contrary to expectations based on such prior disclosures, the terpolyamides of this invention exhibit degrees of water absorption which are, in general, substantially as great as and in many cases significantly greater than that of polyhexamethylene adipamide.

The diamines and dicarboxylic acids which are used to prepare the copolyamides of this invention are well known in the art. Examples of the aliphatic diamines are ethylene diamine, tetramethylene diamines, hexamethylene diamine, octamethylene diamine, decamethylene diamine and the like. Suitable straight-chain aliphatic dicarboxylic acids include succinic, glutaric, adipic, pimelic, suberic, azelaic, sebacic, 1,11-undecanedioic and 1,12-dodecanedioic acids. Most suitable among the diphenyl-substituted aliphatic dicarboxylic acids are $\alpha,\alpha'$-diphenyladipic acid, $\alpha,\alpha'$-ditolyadipic acid, $\alpha,\alpha'$-diphenylsuberic acid, $\alpha,\alpha'$-ditolylsebacic acid, $\alpha,\alpha'$-diphenyl-1,12-dodecanedioic acid and the like.

The terpolyamides of this invention may be alternatively prepared with the use of polyamide-forming derivatives of such diamines and/or dicarboxylic acids. Suitable polyamide-forming derivatives of the diamines include the corresponding carbamates and N-formyl compounds. Appropriate derivatives of the acids include the amides and lower alkyl (e.g. methyl, ethyl, propyl or butyl) esters thereof and the corresponding acid halides (e.g. chlorides).

Ordinarily, the terpolyamides of this invention are prepared by copolymerizing substantially equimolar proportions of the appropriate diamines and dicarboxylic acids. That is, the total moles of aliphatic diamine (and/or polyamide-forming derivatives thereof) in the reaction mixture are the substantial stoichiometric equivalent of the total moles of the dicarboxylic acids (and/or polyamide-forming derivatives thereof) in the mixture. Although the diamines and dicarboxylic acids (or their polyamide-forming derivatives) may be combined for polymerization as unreacted compounds, the substantially equimolar proportions of the reactants are in many cases desirably added to the reaction mixture as salts previously formed by reacting about one mole of dicarboxylic acid (or a polyamide-forming derivative thereof) with one mole of diamine (or a polyamide-forming derivative thereof) in a suitable inert solvent (e.g. water, a lower alkanol such as ethanol or a lower alkanol-water mixture).

After combination of the diamine or diamines and the dicarboxylic acids (or their polyamide-forming derivatives) or the preparation of such salts, the terpolyamides of this invention are prepared by procedures known in the art and commonly employed in the manufacture of polyamides by condensation of bifunctional dicarboxylic acids and bifunctional diamines. Illustrative methods are those described in U.S. Pats. Nos. 2,130,523 and 2,130,948. In accordance with such methods, the reactants or the salts thereof are heated at a temperature of from 180° to 320° C. and preferably from 200° to 295° C. until the product has a sufficiently high molecular weight to exhibit fiber-forming properties, which properties are reached when the copolyamide has an intrinsic viscosity of at least about 0.4. The reaction can be conducted at superatmospheric, atmospheric, or subatmospheric pressure. It is often desirable, especially in the last stage of the reaction, to employ conditions (e.g. reduced pressure) which will aid in the removal of the reaction by-products. Preferably the reaction is carried out in the absence of oxygen, for example, in an atmosphere of nitrogen.

Intrinsic viscosity as employed herein is defined as $$\lim_{C \to 0} \left( \frac{\log_e N_r}{C} \right)$$

in which $N_r$ is the relative viscosity of a dilute solution of the polymer in m-cresol in the same units at the same temperature and C is the concentration in grams of polymer per 100 cubic centimeters of the solution.

In order to illustrate the invention and the advantages thereof with greater particularity, the following specific examples are included. It should be understood that they are only illustrative and do not represent any limitations on the scope of the invention. Proportions are by weight except where otherwise noted.

EXAMPLE I

A solution containing 120.5 parts (80 mole percent) of hexamethylene diammonium adipate, 16.25 parts (10 mole percent) of hexamethylene diammonium terephthalate and 23.8 parts (10 mole percent) of hexamethylene diammonium $\alpha,\alpha'$-diphenyladipate dissolved in 100 parts of water was placed in a stainless steel high-pressure autoclave which had been previously purged of oxygen with purified nitrogen. The temperature and pressure within the autoclave were slowly raised until values of 220° C. and 250 p.s.i.g., respectively, were reached. The temperature was then further increased to 243° C. while the pressure was maintained at 250 p.s.i.g. by removal of steam. Thereafter, the pressure within the autoclave was gradually reduced to atmospheric over a 25-minute period. During this period the temperature was allowed to level out between 280° and 300° C. at which temperature the polymer melt was allowed to equilibrate for 30 minutes. The resulting random terpolymer was substantially completely transparent and melted at 242.5° C. This molten polymer was melt-spun directly from the bottom of the autoclave through a single-orifice spinneret, yielding a mono-filament having good textile properties.

EXAMPLE II

A solution of 84.3 parts (60 mole percent) of hexamethylene diammonium adipate, 30.3 parts (20 mole percent) of hexamethylene diammonium terephthalate and 44.5 parts (20 mole percent) of hexamethylene diammonium $\alpha,\alpha'$-diphenyladipate dissolved in 100 parts of water was placed in a stainless steel high-pressure autoclave. Polymerization of the mixture was brought about by the procedure set forth in Example I. The resulting random terpolymer was substantially completely transparent and melted at 229.5° C. The finished polymer was melt-spun from the autoclave through a single-orifice spinneret, yielding a mono-filament having good textile properties.

EXAMPLE III

A solution of 68.4 parts (50 mole percent) of hexamethylene diammonium adipate, 36.2 parts (25 mole percent) of hexamethylene diammonium terephthalate and 53.8 parts (25 mole percent) of hexamethylene diammonium $\alpha,\alpha'$-diphenyladipate dissolved in 100 parts of water was placed in a stainless steel high-pressure autoclave. Polymerization of the mixture was brought about by the procedure set forth in Example I. The resulting random terpolymer was substantially completely transparent and melted at 226.5 C. The finished polymer was melt-spun from the autoclave through a single-orifice spinneret, yielding a mono-filament having good textile properties.

EXAMPLE IV

A solution of 84.3 parts (60 mole percent) of hexamethylene diammonium adipate, 44.5 parts (30 mole percent) of hexamethylene diammonium terephthalate and 21.75 parts (10 mole percent) of hexamethylene diammonium $\alpha,\alpha'$-diphenyladipate dissolved in 100 parts of water was placed in a stainless steel high-pressure autoclave. Polymerization of the mixture was brought about by the procedure set forth in Example I. The resulting random terpolymer was substantially completely transparent and melted at 262.5° C. The finished polymer was melt-spun from the autoclave through a single-orifice spinneret, yielding a mono-filament having good properties.

Comparative tests were conducted to determine the boiling water shrinkage and water absorption of the terpolyamide fibers of Examples I–IV relative to that of conventional polyhexamethylene adipamide (nylon 66) fiber. Boiling water shrinkage was determined by immersing the fibers in boiling water for five minutes and measuring the lengths of the fibers before and after the immersion. The percentage boiling water shrinkage is determined by the following formula:

$$\frac{\text{length before exposure} - \text{length after exposure}}{\text{length before exposure}} \times 100$$

Water absorption was determined by drying the fibers in a vacuum oven at 60° C. and a pressure of 50 mm. Hg for four hours, then exposing the dried fibers to 25° C. air having a relative humidity of 65% for 48 hours, weighing the fibers thus exposed, then desiccating the fibers completely in a vacuum oven at 60° C. and a pressure of 50 mm. Hg for 24 hours and weighing the desiccated fibers. The percentage water absorption is determined by the following formula:

$$\frac{\text{wt. of fibers exposed at 65\% RH} - \text{wt. of desiccated fibers}}{\text{wt. of desiccated fibers}} \times 100$$

The results obtained in the boiling water shrinkage and water absorption tests are given in the following table:

| Example: | Boiling water shrinkage, percent | Water absorption, percent |
|---|---|---|
| I | 19.5 | 3.7 |
| II | 34.3 | 5.5 |
| III | 24.7 | 4.9 |
| IV | 25.3 | 4.4 |
| Nylon 66 (control) | 10.3 | 4.6 |

As can be seen from the table, the fibers prepared from the terpolyamides of the present invention exhibit percentages of boiling water shrinkage that are significantly higher than that of the polyhexamethylene adipamide fibers and, additionally, degrees of water absorption resistance which are, in most cases, substantially as low as or lower than that of the polyhexamethylene adipamide fibers.

I claim:

1. A substantially completely transparent linear fiber-forming terpolyamide composed of units having the structure

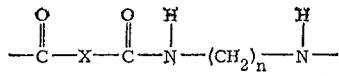

wherein $n$ is an integer from 2 to 10, X in 50 to 90 percent of said units is a $C_2$–$C_{10}$ polymethylene radical, X in 5 to 45 percent of said units is a meta-phenylene or para-phenylene radical and X in 5 to 45 percent of said units has the structure

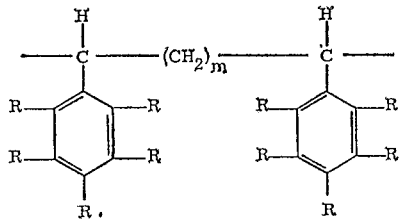

wherein each R is hydrogen or $C_1$–$C_4$ alkyl and $m$ is an integer from 2 to 8.

2. The terpolyamide of claim 1 wherein $n$ is 6.
3. The terpolyamide of claim 1 wherein X in 50 to 90 percent of said units is a tetramethylene radical.
4. The terpolyamide of claim 1 wherein each R is hydrogen and $m$ is 2.
5. The terpolyamide of claim 1 wherein X in 50 to 80 percent of said units is a $C_2$–$C_{10}$ polymethylene radical, X in 10 to 30 percent of said units is a meta-phenylene or para-phenylene radical and X in 10 to 25 percent of said units has the structure

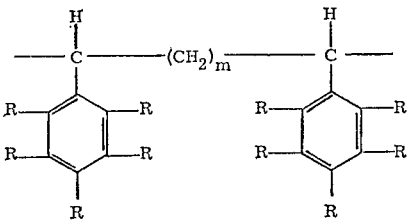

wherein each R is hydrogen or $C_1$–$C_4$ alkyl and $m$ is an integer from 2 to 8.

6. The terpolyamide of claim 5 wherein $n$ is 6.
7. The terpolyamide of claim 5 wherein X in 50 to 90 percent of said units is a tetramethylene radical.
8. The terpolyamide of claim 5 wherein each R is hydrogen and $m$ is 2.
9. A substantially completely transparent linear fiber-forming terpolyamide composed of units having the structure

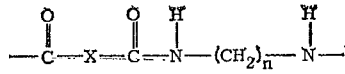

wherein $n$ is an integer from 2 to 10, X in 50 to 60 percent of said units is a $C_2$–$C_{10}$ polymethylene radical, X in 20 to 25 percent of said units is a meta-phenylene or para-phenylene radical and X in 20 to 25 percent of said units has the structure

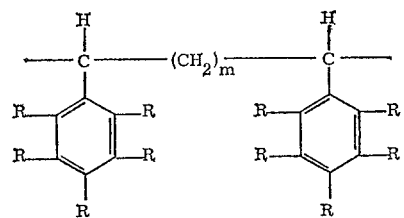

wherein each R is hydrogen or $C_1$–$C_4$ alkyl and $m$ is an integer from 2 to 8.

10. The terpolyamide of claim 9 wherein $n$ is 6, X in 50 to 60 percent of said units is a tetramethylene radical, each R is hydrogen and $m$ is 2.

References Cited
UNITED STATES PATENTS

| | | | |
|---|---|---|---|
| 2,865,894 | 12/1958 | Greensberg et al. | 260—78 R |
| 2,880,196 | 3/1959 | Frank et al. | 260—78 R |
| 2,953,548 | 9/1960 | Schott et al. | 260—78 R |
| 3,432,476 | 3/1969 | Kuwabara et al. | 260—78 R |

HAROLD D. ANDERSON, Primary Examiner

U.S. Cl. X.R.

2—239; 57—140 R; 161—169; 260—33.4 R